United States Patent
Nishiwaki et al.

(10) Patent No.: US 6,764,642 B2
(45) Date of Patent: Jul. 20, 2004

(54) SHREDDER DUST FEEDING DEVICE, REVERBERATORY FURNACE PROVIDED WITH THIS FEEDING DEVICE, AND FURNACE FOR BURNING SHREDDER DUST

(75) Inventors: Michio Nishiwaki, Iwaki (JP); Kiyomi Tobe, Iwaki (JP); Takayuki Sato, Kaduno-gun (JP); Kaoru Suzuki, Iwaki (JP); Shigeru Ishikawa, Iwaki (JP)

(73) Assignee: Onahama Smelting and Refining Co., Ltd., Tokyo (JP)

( * ) Notice: Subject to any disclaimer, the term of this patent is extended or adjusted under 35 U.S.C. 154(b) by 55 days.

(21) Appl. No.: 10/075,162

(22) Filed: Feb. 14, 2002

(65) Prior Publication Data

US 2002/0195754 A1 Dec. 26, 2002

Related U.S. Application Data

(63) Continuation-in-part of application No. 09/896,203, filed on Jun. 29, 2001, now abandoned.

(30) Foreign Application Priority Data

Jun. 26, 2001 (JP) ........................................ P2001-192311

(51) Int. Cl.[7] ............................................. C22B 7/00
(52) U.S. Cl. ..................... 266/182; 110/118; 110/249
(58) Field of Search ........................ 266/182; 110/118, 110/249

(56) References Cited

U.S. PATENT DOCUMENTS

| | | | | |
|---|---|---|---|---|
| 5,782,188 A | * | 7/1998 | Evans et al. | 110/346 |
| 6,230,634 B1 | * | 5/2001 | Okochi et al. | 110/342 |
| 2002/0053306 A1 | * | 5/2002 | Nishiwaki et al. | 110/249 |

* cited by examiner

Primary Examiner—Melvyn Andrews
(74) Attorney, Agent, or Firm—Scully, Scott, Murphy & Presser

(57) ABSTRACT

The present invention relates to a device for feeding shredder dust to a furnace such as a reverberatory furnace. This device comprises a feeding chute that passes to the inside of the reverberatory furnace and is fitted to the ceiling of the reverberatory furnace. Shredder dust can be fed from this feeding chute which also allows oxygen enriched air to be supplied to the feeding chute and fed to the inside of the reverberatory furnace. Further, the present invention relates to a reverberatory furnace in which a burner is able to be installed in a wall portion of one end side thereof. A plurality of feeding ports to which are connected the feeding chutes of the shredder dust feeding devices are provided at the one end side in the ceiling portion thereof forming a plurality of staggered rows facing the other end side.

6 Claims, 14 Drawing Sheets

SHREDDER DUST FEEDING DEVICE, REVERBERATORY FURNACE PROVIDED WITH THIS FEEDING DEVICE, AND FURNACE FOR BURNING SHREDDER DUST

CROSS-REFERENCE TO RELATED APPLICATIONS

This is a continuation-in-part application of application Ser. No. 09/896,203 filed on Jun. 29, 2001 now abandoned.

BACKGROUND OF THE INVENTION

1. Field of the Invention

The present invention relates to a feeding device for shredder dust for performing an incinerating process by burning shredder dust comprising various shredded waste materials by feeding the shredder dust to a furnace such as a reverberatory furnace for non-ferrous smelting and to a furnace provided with this feeding device.

2. Description of the Related Art

In recent years the processing of industrial waste materials has become a problem for society. Currently, the landfilling of waste materials is severely restricted and incineration methods are also regulated so as to prevent dioxin from being generated. In this situation, in order to recover various metals such as copper, gold, silver, and, palladium without generating dioxin, the inventors of the present invention attempted the processing of automobile shredder dust in a reverberatory furnace. Here, the term shredder dust is used to refer generally to fluff materials coming out when scrapped vehicles are crushed in order to recover steel and aluminum. Shredder dust is more easily burnt than chipped tires and also contains valuable metals; therefore, the processing ratio of such attempts is continually improving.

A schematic flow chart of the processing of automobile shredder dust in a reverberatory furnace is shown in FIG. 16. In this flow chart, the reverberatory furnace 1 is a green charge type (wet charge type) reverberatory furnace used for non-ferrous smelting and in particular for smelting copper concentrates. Industrial waste materials such as automobil shredder dust are stored in the stockyard 2, then transported to the reverberatory furnace 1 by conveyors 4 from the feed hopper 3 and fed into the inside of the reverberatory furnace 1 through a feeding chute composed by such as a steel pipe. The industrial waste materials are then processing in the reverberatory furnace 1 together with copper concentrates. Oxygen enriched air is also supplied to the reverberatory furnace 1 from an oxygen plant 5.

Moreover, the off-gas from the reverberatory furnace 1 is cooled through a waste heat boiler 6 for recovering heat and, then the dust in the off-gas has been collected by an electrostatic precipitator 7, $SO_2$ in the gas is fixed as gypsum by a gypsum plant 8. Note that the steam generated in the waste heat boiler 6 is used to generate electrical power in a turbine generator 9, however, the amount of generated power corresponds to approximately half of the total amount of power consumption at the smelter. On the other hand, in the period when the converter is operating, dried copper concentrates and oxygen from the oxygen plant 5 are fed into the converter 10 and the off-gas is fed to the sulfuric acid plant 13 via the boiler 11 and the electrostatic precipitator 12. Moreover, an anode produced from the converter 10 via an anode furnace 14 is refined to electrolytic copper in a tank house (electro-refining plant) 15. In this tank house 15, gold, silver, and palladium are collected in anode slime.

As the present inventors were continuing the above described attempts, they noticed that there were several problems that needed to be resolved arising from the burning of shredder dust in the reverberatory furnace 1 in the above described manner. One of these problems was that the amount of shredder dust to be processed in the reverberatory furnace 1 was limited by the volume of off-gas expelled from the reverberatory furnace 1. Namely, if the atmosphere inside the reverberatory furnace 1 becomes insufficient in oxygen due to the off-gas generated in the burning of the shredder dust previously supplied or to the burning off-gases caused by fuel directly fed from the burner into the reverberatory furnace 1 and burnt therein, then even if new shredder dust is fed into the reverberatory furnace 1, this cannot be easily burnt and simply accumulates in an unprocessed state inside the reverberatory furnace 1.

Moreover, as described above, the shredder dust is stored the stockyard 2 of the smelter, transported by the conveyor 4 from the feed hopper 3, then fed to the inside of the reverberatory furnace 1 via a feeding chute. However, for example, if the feeding chute is simply installed in the ceiling of the reverberatory furnace 1 and the shredder dust simply fed into this chute, the off-gases increase and in cases in which it is not possible to maintain a sufficient negative draft inside the reverberatory furnace 1, there is the concern that the gas inside the furnace will leak out by the feeding chute. Since the ceiling needs to be so secure that the gas inside the furnace does not leak even when the shredder dust is being fed, it is necessary to provide a double-damper, for example, which results, of course, in the operation of feeding the shredder dust becoming complicated, but also means that continuous feeding is difficult. The ultimate result is that restrictions are placed on the amount of shredder dust that can be processed.

Another problem is that if shredder dust remains as unburnt condition when the shredder dust is charged to the reverberatory furnace 1, this unburnt shredder dust piles up in the reverberatory furnace 1 forming small hills (piles) in the furnace. If the dimension of these piles increases, the clearance between them and the ceiling of the reverberatory furnace 1 becomes smaller. As a result, when new shredder dust is fed to the top of the pile, the hot-gas goes out of the reverberatory furnace 1 through the feeding chute positioned directly above the pile, creating the concern that the conveyor belt used for transporting the shredder dust may be burnt. Moreover, particularly if these large piles are formed nearby the burners inside the reverberatory furnace 1, then the burning condition of the burners is disturbed which naturally results in the burning of the shredder dust not being possible, and also results in the burner combustion heat not being able to be used effectively for melting copper concentrates.

The present invention was achieved on the basis of these circumstances and it is an object thereof to provide an device for feeding shredder dust to a reverberatory furnace capable of securing the sealing of a feeding chute when shredder dust is fed to a reverberatory furnace used for non-ferrous smelting as described above and for ensuring that the shredder dust is burnt properly and thereby achieving an increase in the amount of this processing that can be performed.

In addition, a further aim of the present invention is to provide a furnace such as a reverberatory furnace in which the formation of large piles in the reverberatory furnace caused by unburnt of shredder dust is prevented, and in which the blocking of the propagation of combustion heat from the burner is prevented, and also in which hot gas is prevented from leaking out of the furnace.

SUMMARY OF THE INVENTION

In order to solve the above problems and achieve these objects, the structure described below has been employed in the present invention. Namely, the present invention relates to the device for feeding shredder dust to a reverberatory furnace through which shredder dust is fed to a reverberatory furnace for non-ferrous smelting, and in particular, to a device for feeding shredder dust to a reverberatory furnace in which a feeding chute that passes to the inside of the reverberatory furnace is fitted to the ceiling of the reverberatory furnace and shredder dust can be fed from this feeding chute, and which also allows oxygen enriched air to be supplied to the feeding chute and fed to the inside of the reverberatory furnace.

In this case, the feeding chute is branched partway along its length and it is desirable that the shredder dust is fed from one end thereof while the oxygen enriched air is supplied in from the other end thereof.

It is also desirable that an air supply nozzle that has a smaller diameter than the feeding chute is inserted in the other end of the branched feeding pipe and the distal end of the air supply nozzle is positioned adjacent to the branched portion of the feeding chute and that the oxygen enriched air is supplied in from the air supply nozzle.

Furthermore, the present invention relates to a reverberatory furnace for non-ferrous smelting provided with the shredder dust feeding device, and in particular, to a reverberatory furnace for non-ferrous smelting in which a burner is able to be installed in a wall portion of one end side thereof and a plurality of feeding ports to which are connected the feeding chutes of the shredder dust feeding device are provided at the one end side at a ceiling portion forming a plurality of staggered rows facing another end side.

In this case, it is desirable that, in the ceiling portion, the one end side where the feeding ports are provided is raised above the other end side.

Moreover, it is desirable that a feeding chute of the feeding device is connected to each one of the plurality of feeding ports and the positions at which shredder dust is fed to the feeding hoppers are arranged in a single row.

The second aspect of the present invention relates to a furnace for burning shredder dust which comprises: a furnace body; a burner provided on the wall on one side of the furnace body that emits a flame to the interior of the furnace body; one or a plurality of a raw material feeding openings provided on the side of the ceiling on the one side for feeding the raw material to be smelted to the interior of the furnace body; one or a plurality of a fuel and oxidizing gas feeding openings provided at the center of the ceiling on the one side; a main feeding chute installed in the fuel and oxidizing gas feeding opening; a first feeding chute installed inside the main feeding chute that feeds a compressed oxidizing gas to the furnace body; and a dust feeding chute that is connected to the main feeding chute and feeds shredder dust in the interior of the furnace body via the fuel and oxidizing gas feeding opening. A second feeding chute that feeds compressed oxidizing gas into the main feeding chute is installed vertically as a combustion device for the shredder dust; and the second feeding chute is installed such that the distal end thereof blows oxidizing gas to the shredder dust falling into the interior of the furnace body.

In this second aspect of the present invention, a second feeding chute is installed vertically inside the main feeding chute as a combustion means for shredder dust, and the distal end of the second feeding chute is provided such that a compressed oxidizing gas is blown on the shredder dust that has fallen into the furnace body. Thereby, by increasing the proportion of the oxidizing gas that reaches the shredder dust, the shredder dust does not accumulate and is burnt. Even if it were to accumulate, it would be scattered by the compressed oxidizing gas fed by the second feeding chute, and thus the combustion efficiency is improved.

The second feeding chute may be hung so as to be movable up and down by a wire or the like. In this case, because the second feeding chute is hung such that it can be moved up and down by a wire, the height of the distal end of the second feeding chute from the furnace hearth can be adjusted.

The furnace may comprise a third feeding chute that is provided on one side of the furnace body and feeds compressed oxidizing gas so as to blow on the shredder dust falling into the interior of said furnace body. In this case, because a third feeding chute that blows compressed oxidizing gas to the falling shredder dust is provided on one side of the wall of the furnace body, the combustion efficiency is further improved.

The second feeding chute and the third feeding chute may comprise an iron or stainless steel chute body and a refractory material that covers the periphery of said chute body. In this case, because the structure of the second feeding chute and the third feeding chute has two layers comprising a chute body made of iron or stainless steel and a refractory material covering the periphery of the chute body, its durability is superior.

DESCRIPTION OF THE PREFERRED EMBODIMENTS

Preferred embodiments of the present invention will be explained referring to the figures. However, the present invention is not limited to only the following embodiments, various modifications may be added within a scope which does not deviate from the gist of the present invention. Furthermore, features of the following embodiments may be combined with each other.

First Embodiment

Figure 1:
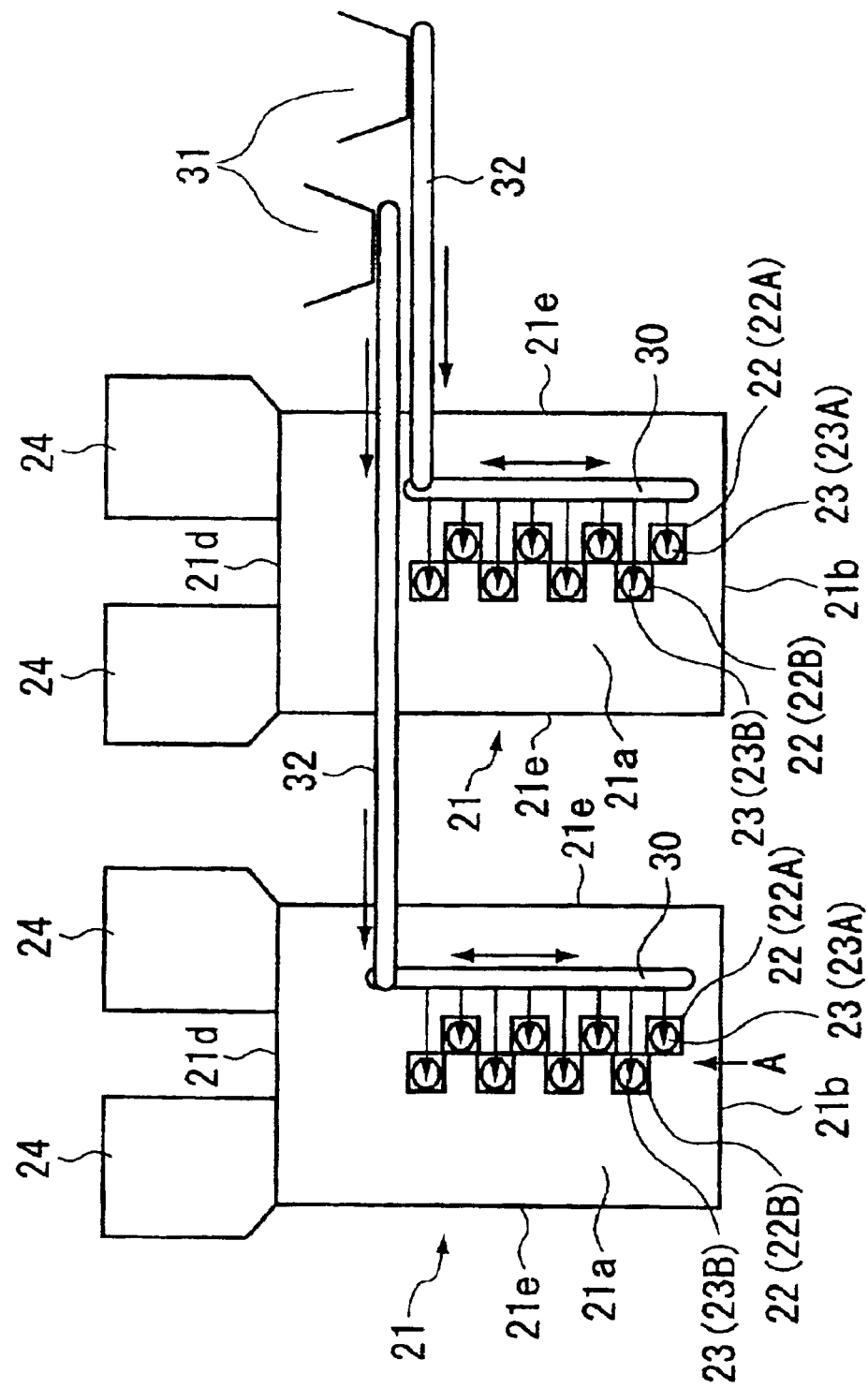
FIG. 1 is a plan view showing the schematic structure of a reverberatory furnace according to the present invention.
Figure 2:
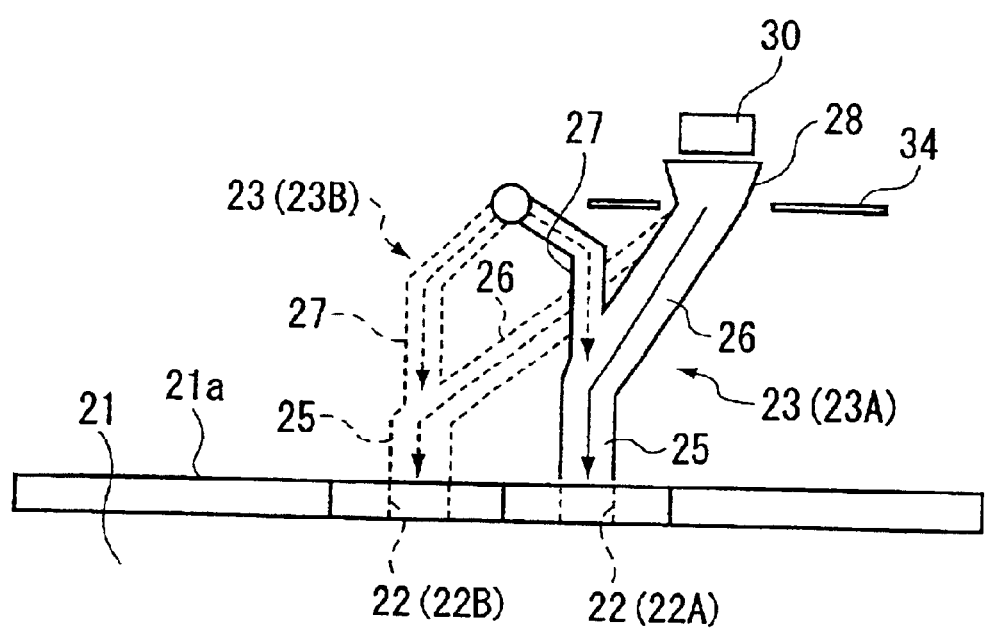
FIG. 2 is a side view as seen from the direction of the arrow A in FIG. 1 showing the schematic structure of the feeding device according to the present invention.

FIGS. 1 through 8 show a first embodiment of the present invention. In this embodiment, the present invention is applied to a green charge type (wet charge type) of reverberatory furnace 21 used for smelting copper concentrates. In the present embodiment, as is shown in FIG. 1, reverberatory furnaces 21 and 21 are provided in parallel and eight feeding ports 22 are provided in each ceiling portion 21a of the reverberatory furnaces 21 and 21. As is shown in FIG. 2, a shredder dust feeding facilities 23 is provided for each of the feeding ports 22. As is shown in FIG. 1 and in FIGS. 3 to 5, as seen in plan view, the reverberatory furnaces 21 are formed in a substantially elongated schematic box shape and one end side in the longitudinal direction thereof (i.e. the bottom side in FIG. 1 and the right side in FIGS. 3 and 4) is the side where the burner is provided. A plurality of window portions 21c for burner installation are formed in the wall portion 21b of the one end side in the longitudinal direction, and two waste heat boilers 24 and 24 are connected to each reverberatory furnace 21 at the wall portion 21d of the other end side in the longitudinal direction (i.e. at the top side in FIG. 1 and the left side in FIGS. 3 and 4). Note that a plurality of unillustrated hoppers used for inserting copper concentrates are provided at the burner side of the ceiling portions 21a of the reverberatory furnaces 21 in a line along the wall portions 21e and 21e that extend in the longitudinal direction of the reverberatory furnace 21.

Figure 3:
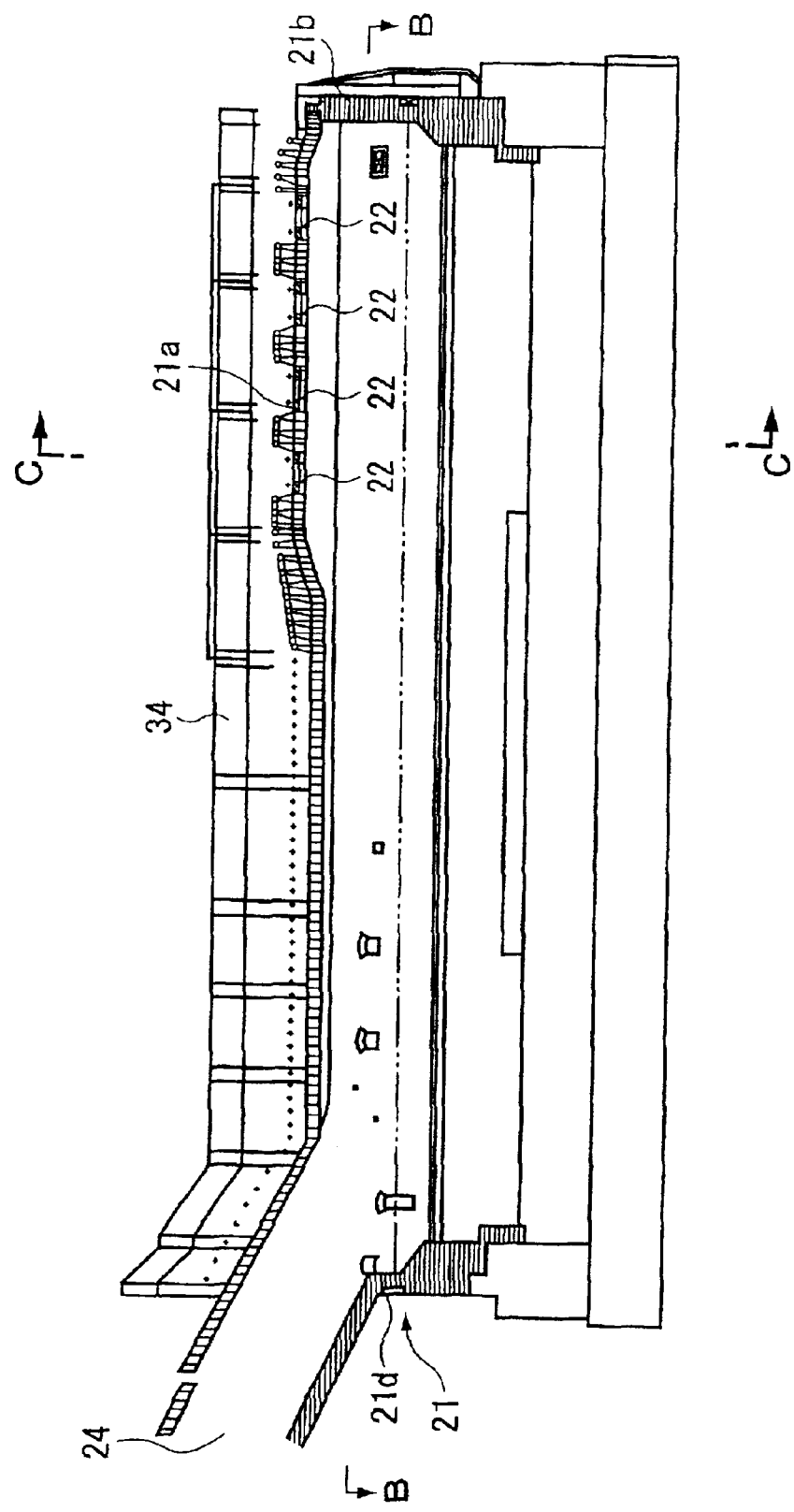
FIG. 3 is a side cross sectional view showing in detail a portion of the reverberatory furnace according to the present invention.
Figure 4:
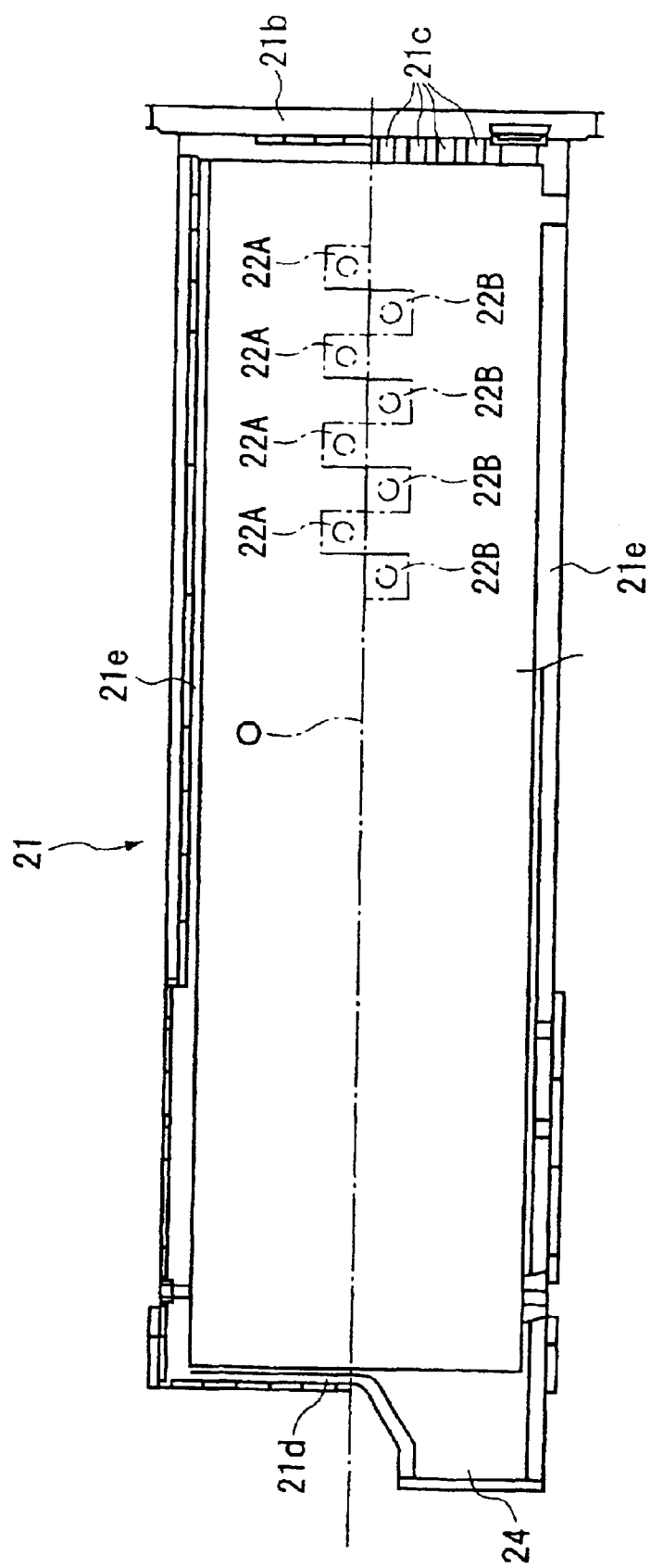
FIG. 4 is a horizontal cross sectional view of the reverberatory furnace shown in FIG. 3 (wherein below the center line O shows the cross section along the line B—B in FIG. 3).
Figure 5:
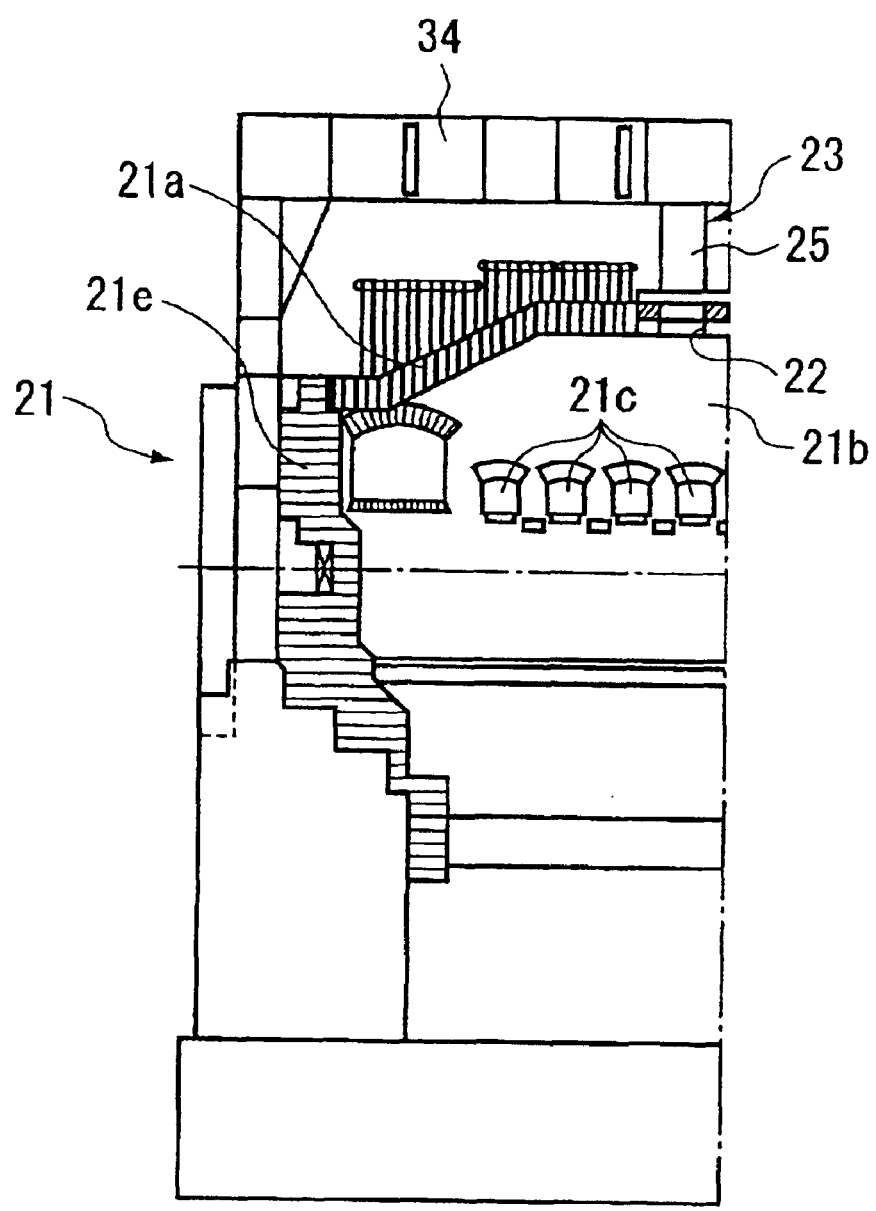
FIG. 5 is a half sectional view taken along the line C—C in FIG. 3.

Approximately half of each ceiling portion 21a of the reverberatory furnaces 21 at the one end side in the longitudinal direction where the burner is situated is formed slightly raised above the other end side, as is shown in FIG. 3, and the above eight feeding ports 22 are provided at this raised portion at the one end side. These feeding ports 22 are arranged in two rows as seen in plan view in the vicinity of the center line O in the transverse direction of the reverberatory furnace 21 (i.e. in the horizontal direction in FIGS. 1 and 5 and in the vertical direction in FIG. 4) such that the same number (four) thereof are placed on either side of this center line O and in rows parallel thereto. In addition, the distance from each row of feeding ports 22A . . . and 22B to the center line O is equal.

In addition, the four feeding ports 22A . . . and 22B in each row are arranged equidistantly in the direction of the center line O, namely, in the aforementioned longitudinal direction. Moreover, the distance between adjacent feeding ports 22 and 22 in the direction of the center line O is set equal to each other in the same row. In addition, the feeding ports of the other row are positioned at the center of adjacent feeding ports 22 and 22 in the direction of the center line of one row. Namely, the feeding ports 22A and the feeding ports 22B are arranged so as to alternate in a staggered (i.e. zigzag) pattern along the direction of the center line O. Note that the portion of the ceiling portion 21a where these feeding ports 22 are provided is constructed as a water cooled copper jacket.

Figure 6:
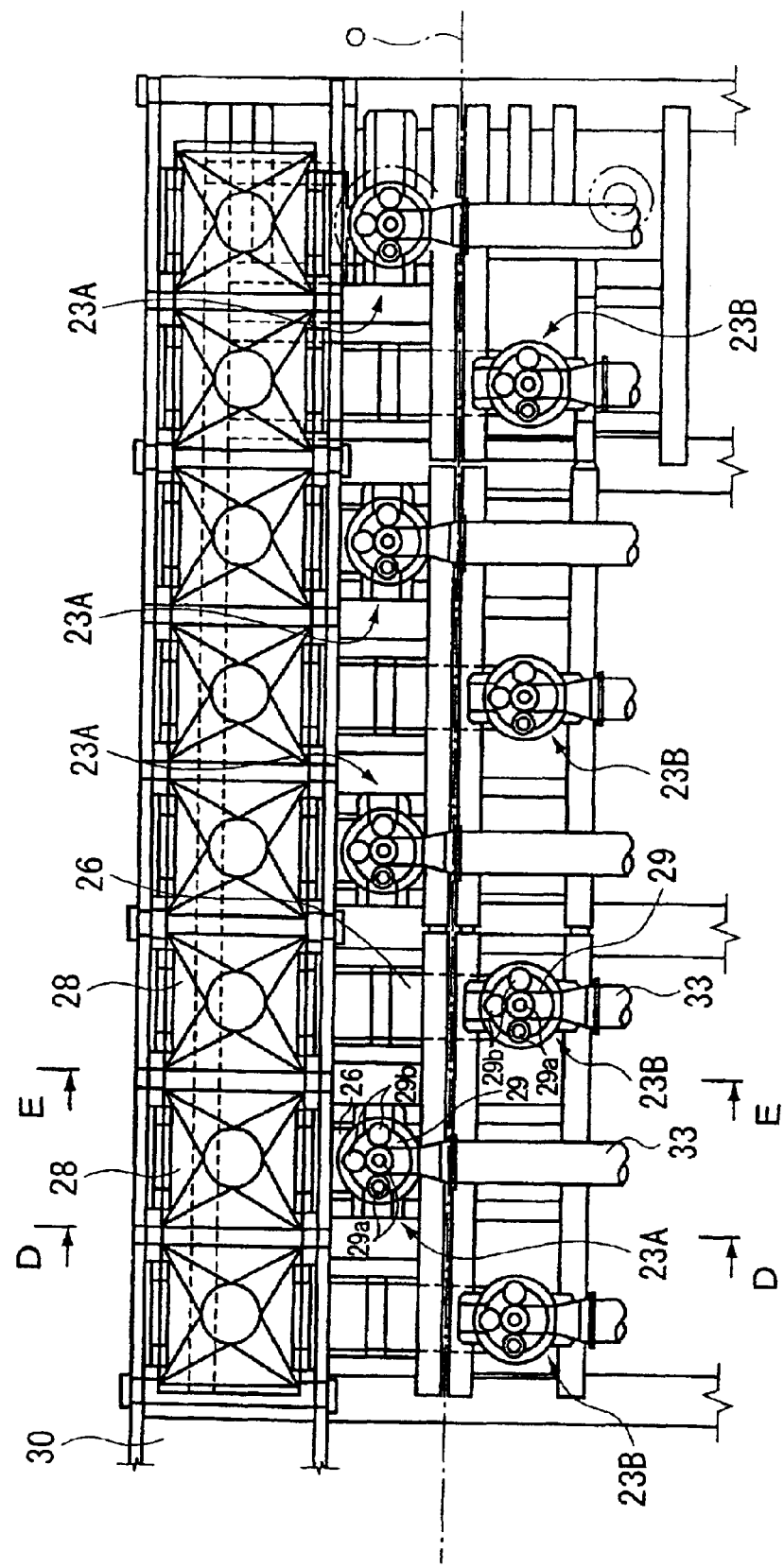
FIG. 6 is a plan view showing in detail a portion of the feeding facilities (devices) according to the present invention.
Figure 7:
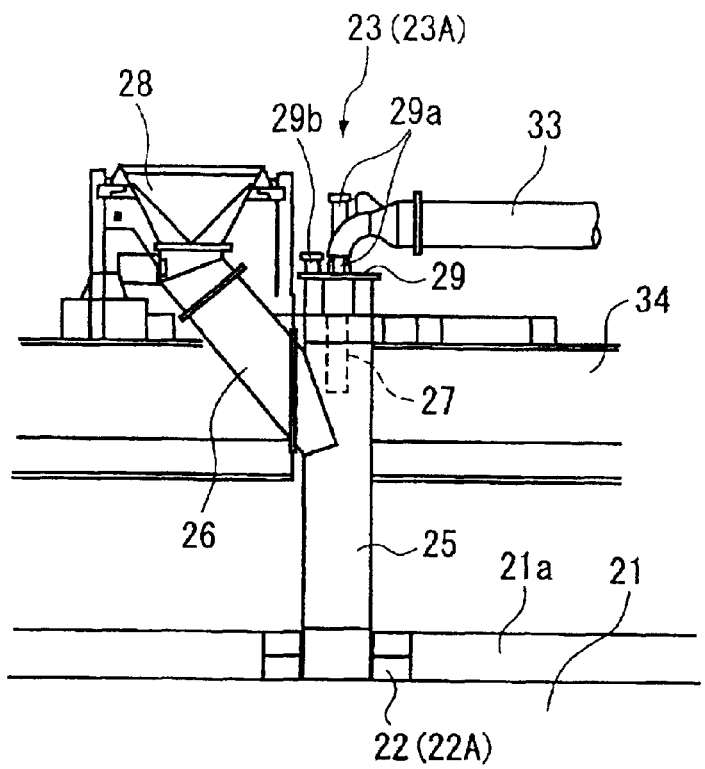
FIG. 7 is a cross sectional view taken along the line D—D in FIG. 6.
Figure 8:
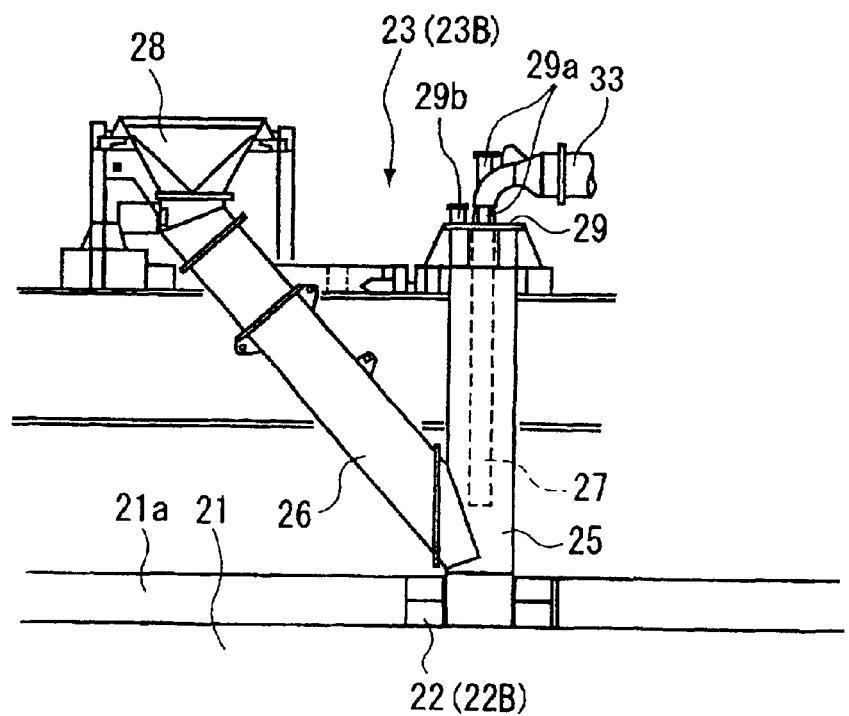
FIG. 8 is a cross sectional view taken along the line E—E in FIG. 6.

As is shown in FIG. 2, the bottom ends of the feeding facilities 23 provided for each of the feeding ports 22 arranged in this way are connected to the feeding ports 22 and open onto the inside of the reverberatory furnace 21. In addition, the feeding facilities 23 are provided with feeding chute 25 that are provided at the ceiling portion 21a so as to extend vertically upwards. More specifically, as is shown in FIGS. 6 to 8, branch pipes 26 having the same diameter as the feeding chute 25 branch out extending in a diagonally upward direction from partway along the vertically extending feeding chutes 25. In addition, air supply nozzles 27 having a smaller diameter than the feeding chutes 25 are inserted coaxially with the feeding chutes 25 into the feeding chutes 25 from the top end thereof. Hoppers 28 are provided via a freely removable insertion damper at the top end portion of the branch pipes 26, namely, at the position where shredder dust is fed to the feeding chutes 25. At the top end portion of the feeding chutes 25 into which the air supply nozzles 27 are inserted, the peripheries of the air supply nozzles 27 are sealed by lid bodies 29. An observation window 29a manufactured from heat resistant glass and an inspection opening 29b that is normally closed are provided in each lid body 29.

Here, as is shown in FIG. 7, in the feeding facilities 23A attached to the four feeding ports 22A forming the aforementioned one row from out of the feeding facilities 23 attached to the feeding ports 22, short branch pipes 26 branch from a position in the upper end portion of the feeding chutes 25 diagonally upwards in a direction away from the center line O along a plane that intersects the center line O. In contrast, as is shown in FIG. 8, in the feeding facilities 23B attached to the feeding ports 22B forming the other row and positioned on the opposite side of the center line O from the one row of feeding ports 22A, long branch pipes 26 branch from a position in the bottom end portion of the feeding chutes 25 diagonally upwards at a sloping angle equal to that of the above branch pipes 26 of the feeding facilities 23A along a plane that intersects the center line O. Furthermore, as seen in plan view, these branch pipes 26 extend beyond the center line O to the side of the one feeding facilities 23A (note that, for this description, in FIG. 2, the sloping angles of the branch pipes 26 in both feeding facilities 23A and 23B are shown as being different).

Figure 16:
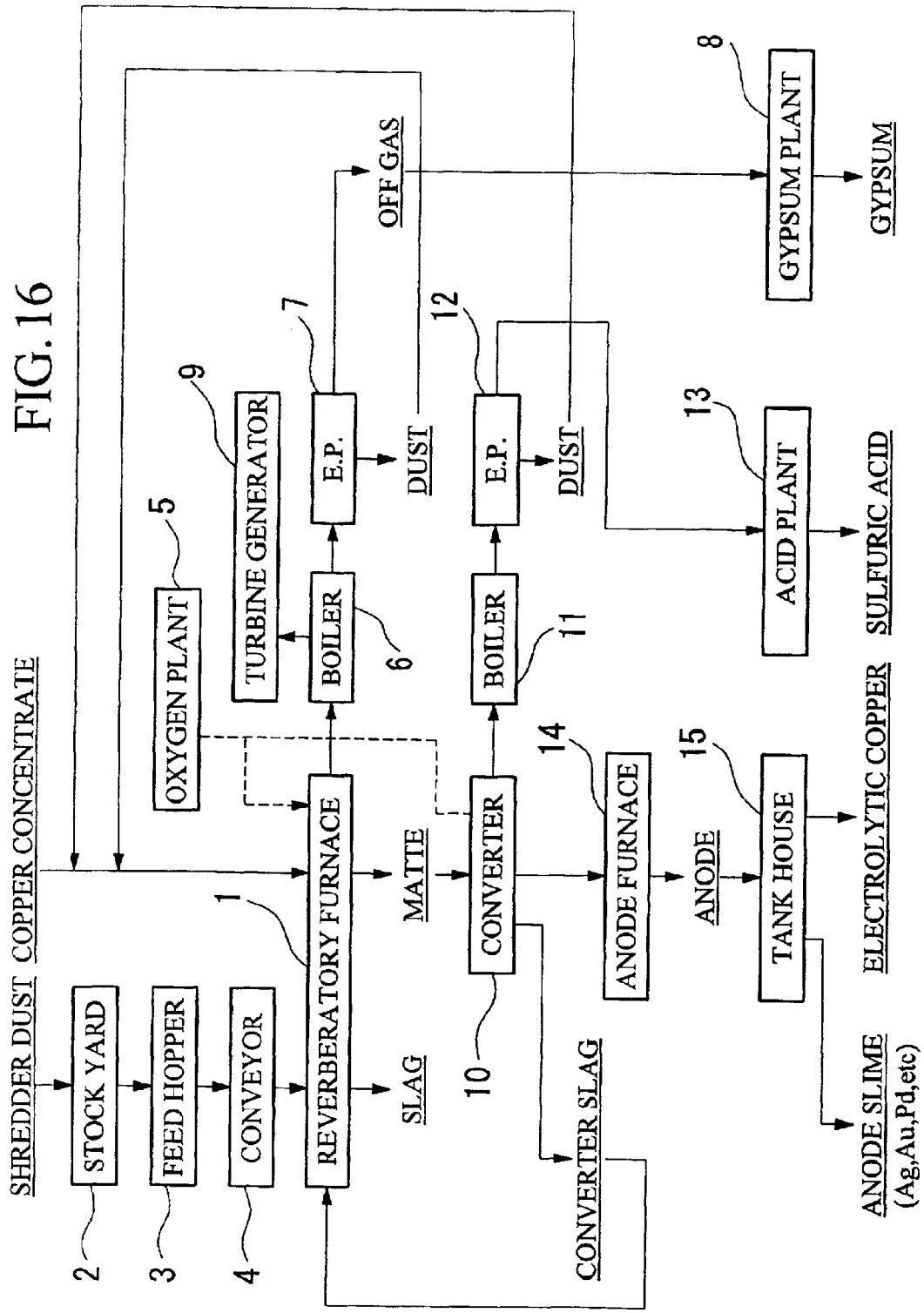
FIG. 16 is a flow chart for when shredder dust is fed to a reverberatory furnace used for smelting copper concentrates.

By making the length and the positions where the branch pipes 26 branch from the feeding chutes 25 different, regardless of whether or not the positions of the feeding ports 22A and 22B in the transverse direction in the feeding facilities 23A and 23B are different, namely, regardless of whether or not the positions of the feeding chutes 25 are different, the hoppers 28 are provided on a straight line parallel with the center line O such that the positions of the hoppers 28, namely, the positions at which the shredder dust is fed to the feeding chutes 25, have the same height and match each other in the transverse direction, as is shown in FIG. 6. Furthermore, a shuttle conveyor 30 is provided extending parallel to the center line O directly above the hoppers 28 of the feeding facilities 23A and 23B arranged thus in a straight line. As a result, when the insertion dampers are removed to the branch pipes 26, as is shown in FIG. 1, by loading the shredder dust that has been transported via the conveyor belt 32 (corresponding to the conveyor belt 4 in FIG. 16) from the feed hopper 31 (corresponding to the feed hopper 3 in FIG. 16) into the hoppers 28 of each feed facilities 23 from the shuttle conveyor 30, it is possible to feed the shredder dust into the reverberatory furnace 21 through the feed chutes 25 via the branch pipes 26.

The bottom ends of the air supply nozzles 27 that are inserted into the feed chutes 25 through the lid portions 29 from the top end portion of the feeding chutes 25 reach as far as the branch portion of the branch pipes 26 with the feeding chutes 25. Accordingly, in the feeding facilities 23A in which the branch pipes 26 branch from the top end portion of the feeding chutes 25, while the insertion depth of the air supply nozzles 27 from the top end portion of the feeding chutes 25 is shallow, in the feeding facilities 23b in which the branch pipes 26 branch from the bottom end portion of the feeding chutes 25, the insertion depth of the air supply nozzles 27 is deep. In this case, the bottom ends of all of the air supply nozzles 27 are positioned substantially in the center in the vertical direction of the opening formed at the branch portion of the branch pipes 26 with the feeding chutes 25. In contrast, the top end portion of the air supply nozzles 27 of each feeding facilities 23A and 23B are bent in a horizontal direction at the point where they protrude from the lid bodies 29 and are then connected with larger diameter air supply pipes 33. Each air supply pipe 33 is connected to an unillustrated oxygen enriched air supply source such as, for example, the oxygen plant 5 shown in FIG. 16. Oxygen enriched air having a predetermined density and pressure is expelled from the air supply nozzles via the air supply pipes 33 and is able to be supplied into the reverberatory furnace 21 together with shredder dust fed through the branch pipes 26. Note that an operation floor 34 is placed at a distance above the ceiling portion 21a of the reverberatory furnace 21. In the present embodiment, the operation floor 34 is provided with a water cooled plate to insulate it from the heat from the reverberatory furnace 21 and the top end portions of the feeding chutes 25 and the branch pipes 26 protrude above this operation floor 34.

In the facilities 23 for feeding shredder dust to the reverberatory furnace 21 having the structure described above, in order to feed shredder dust that is inserted via the branch pipes 26 from the feeding chutes installed via the feeding ports 22 in the ceiling portion 21a of the reverberatory furnace 21 together with oxygen enriched air supplied in through the air supply nozzles 27 to the reverberatory furnace 21, the shredder dust is inserted into the reverberatory furnace 21 while being burnt by the oxygen enriched air that is supplied together with it. Accordingly, even if the atmosphere inside the reverberatory furnace 21 becomes insufficient in oxygen, it is possible to ensure that the fed shredder dust is incinerated at a high temperature. The result of this is that shredder dust from scrapped automobiles and the like can be reliably processed without generating harmful materials such as dioxin, and also that the heat from the combustion can be used effectively for the smelting of (for example copper concentrates). Moreover, it is possible to suppress the actual formation of the aforementioned piles caused by unburnt shredder dust.

In addition, by feeding shredder dust together with oxygen enriched air to the inside of the reverberatory furnace 21 in this way, the feeding chutes 25 and the feeding ports 22 in the ceiling 21a of the reverberatory furnace 21 to which the shredder dust is fed can be sealed by the pressure of the supplying of the oxygen enriched air. Accordingly, even if the furnace pressure inside the reverberatory furnace 21 changes and a sufficient negative pressure state cannot be maintained inside the reverberatory furnace 21, it is possible to prevent the high temperature gas inside the reverberatory furnace 21 from leaking from the feeding ports 22 through the feeding chutes 25. As a result, without providing a double-damper as in a conventional chute pipe, for example, it is possible to prevent a state in which the conveyor belt of the shuttle conveyor 30 is burned from occurring, and a continuous feed of the shredder dust becomes possible. Namely, according to the feeding facilities 23 having the above described structure, the sealing performance is secured and it is possible to reliably burn the shredder dust and stable, efficient processing of shredder dust can be promoted.

It should be noted that if oxygen enriched air and shredder dust are fed in this way via the feeding chutes 25 to the interior of the reverberatory furnace 21, it is also possible to consider, for example, a means in which the branch pipes 26 as they are in the present embodiment are not provided, and shredder dust is fed to a single feed pipe and is then pressure supplied by oxygen enriched air. However, in a means such as this, the risk of the shredder dust becoming blocked inside this single feed pipe and the supply of the oxygen enriched air being obstructed and the oxygen enriched air then damaging the sealing performance described above must be considered. In contrast to this, in the feeding facilities 23 of the present embodiment, the branch pipes 26 are provided branching off from partway along the feeding chutes 25 and shredder dust is fed from these branch pipes 26 while oxygen enriched air is supplied from the top end portion of the feeding chutes 25. Accordingly, even if the shredder dust becomes blocked inside the branch pipes 26, the supply of the oxygen enriched air is not cut off and, at the least, the sealing performance can be ensured due to the oxygen enriched air and it is possible to reliably prevent high temperature gas from leaking from inside the reverberatory furnace 21.

Furthermore, in the feeding facilities 23 of the present embodiment, when oxygen enriched air is supplied from the top end portion of the feeding chutes 25, the small diameter air supply nozzles 27 are inserted into the feeding chutes 25 and the distal end (i.e. the bottom end) thereof is positioned at the connecting portion of the branch pipes 26 with the feeding chutes 25, and oxygen enriched air is supplied from the air supply nozzles 27 at a predetermined pressure into the feeding chutes 25 and fed into the reverberatory furnace 21. Accordingly, because the portions inside the branch pipes 26 where they connect to the feeding chutes 25 are placed in a negative pressure condition by the oxygen enriched air supplied in via the air supply nozzles 27, the shredder dust inserted into the branch pipes 26 from the hoppers 28 is fed by being sucked into the feeding chutes 25. As a result, it is possible to prevent the shredder dust from becoming blocked and to achieve a reliable and smooth feed of shredder dust.

In addition, in the reverberatory furnace 21 of the present embodiment, in the ceiling portion 21a, the plurality of feeding ports 22 in which the above feeding facilities 23 are provided are placed in a staggered arrangement running from the wall portion 21b of the reverberatory furnace 21 in which the burners are placed in the longitudinal direction of the reverberatory furnace 21, namely, in the direction of the burning by the burners. As a result, it is possible to prevent the formation of the above described large piles inside the reverberatory furnace 21 and to prevent flames from escaping out from the feeding ports 22 and the burning of the burner being obstructed. Namely, by placing the feeding ports 22 in a staggered arrangement, the distance between each of the feeding ports 22 and 22 is increased compared with if, for example, they were placed in a lattice arrangement. Therefore, even if the piles are formed, they can be prevented from becoming too large. The result of this is that, as described above, the gap to the ceiling 21a is maintained and flames are prevented from escaping. In addition, it is possible to spread the burning of the burner over the whole interior of the reverberatory furnace 21 (i.e. as far as the other side) and to melt the copper concentrates, and also to effectively use the heat of the burning of the fed shredder dust.

Furthermore, in the reverberatory furnace 21 of the present embodiment, the portion at one end side of the ceiling portion 21a in the longitudinal direction of the reverberatory furnace 21 where the burner is situated is formed slightly raised above the other end side, and the feeding ports 22 are provided in a staggered arrangement in this raised portion. Accordingly, even if the above described piles do become formed, it is possible to ensure that a sufficient clearance is maintained between the piles and the ceiling portion 21a, therefore, it is possible to even more reliably prevent flames from leaking.

It should be noted that when the feeding ports 22 are arranged in two rows in a staggered arrangement in this manner, if the feeding chutes 25 of the feeding facilities 23 connected to the feeding ports 22 are only provided in the ceiling portion 21a extending vertically, then the feed positions where shredder dust is fed to these feeding pipes 25, namely, the positions of the hoppers 28 also end up being arranged in two staggered rows. Accordingly, in order to insert the shredder dust into this type of hopper 28, it is necessary to provide two rows of shuttle conveyors for transporting the shredder dust from the conveyor belt 32 to a single reverberatory furnace 21.

In contrast, in the case of the reverberatory furnace 21 of the present embodiment, in the feeding facilities 23A attached to the feeding ports 22A forming the one row parallel to the center line O in the reverberatory furnace 21 from out of the feeding ports 22 arranged in a staggered pattern, short branch pipes 26 branch from a position in the upper end portion of the feeding pipes 25 while, in the feeding facilities 23B attached to the feeding ports 22B forming the other row, long branch pipes 26 branch from a position in the bottom end portion of the feeding chutes 25 parallel to the branch pipes 26 of the feeding facilities 23A. Furthermore, the top end positions of the branch pipes 26 to which the shredder dust is fed match each other in height and in their positions in the transverse direction and a single row of the hoppers 28 is provided at the top end thereof. Accordingly, in this reverberatory furnace 21, there only needs to be a single row of the shuttle conveyor 30 for feeding the shredder dust from the hoppers 28 to the feed chutes 25 of each of the feed facilities 23A and 23B via the branch pipes 26. As a result, even if there are a plurality of rows of the feeding ports 22 arranged in a staggered pattern, there does not need to be a plurality of rows of shuttle conveyors 30, which is economical as well as efficient.

Note that, in this reverberatory furnace 21, the feeding ports 22 are arranged in two rows in a staggered pattern, however, it is also possible for the feeding ports 22 to be arranged in three or more rows in the above staggered pattern depending on the size and the like of the reverberatory furnace 21. Moreover, in each row of the feeding facilities 23A and 23B, instead of forming the branch pipes 26 all at an equal slope angle branching out from different positions of the feeding chutes 25, as described above, it is possible, as is shown in FIG. 2, to provide branch pipes 26 having different slope angles and to make both the branch position and the slope angle different. In these examples, in the same way as in the present embodiment, it is also possible to make the positions (the positions of the hoppers 28 in the present embodiment) from which the shredder dust is fed to the feed chutes 25 in one row.

Second Embodiment

Figure 9:
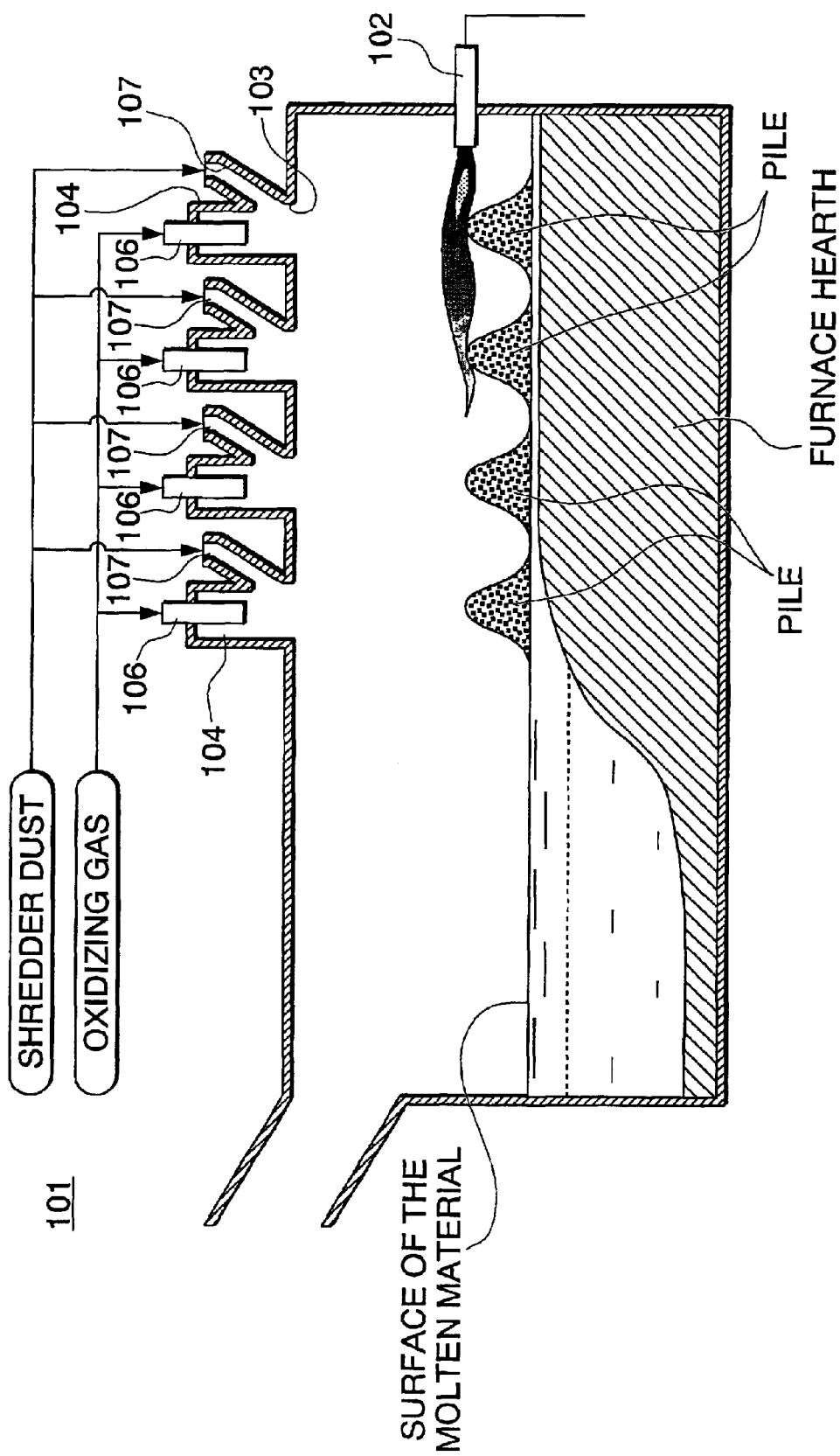
FIG. 9 is a conceptual schematic drawing of a conventional reverberatory furnace that feeds shredder dust to the furnace body.

The object of the second embodiment will be explained referring to FIG. 9. In a reverberatory furnace shown in FIG. 9, a flame is emitted from a burner provided on the wall on one side of the furnace body 101 that uses coal or heavy oil as a fuel, and thereby the interior of the furnace body 101 is heated. Next, the interior of the furnace body 101 is fed with raw material to be smelted from a raw material feeding opening (not illustrated) provided on both sides of the ceiling at one end of the furnace body 101. In addition, inside the furnace body 101, the shredder dust is fed via a fuel and gas feeding opening 103 by the dust feeding chute 107 connected to the main feeding chute 104 installed in the fuel and gas feeding opening 103, which is provided at the center of the ceiling on one side. In order to add the shredder dust fuel, a compressed oxidizing gas is blown from a first feeding chute 106 provided inside the main feeding chute 104 installed on the fuel and gas feeding opening 103, which is installed in the center of the ceiling on one side. The raw material to be smelted that is fed into the furnace body 101 is heated and melted by the radiated heat of the flame emitted from the burner 102 and the combustion heat generated by the combustion of the shredded dust, and the melted raw material to be smelted is divided into matte and slag.

However, in the structure of the above furnace that carries out the smelting of metals using the shredder dust as a fuel, when there is insufficient oxygen in the atmosphere in the interior of the furnace body due to the combusted exhaust gas of the flame of the burner and the exhaust gas generated by the combustion of the shredder dust that has already been fed, even if shredder dust is repeatedly feed to the furnace body, there is the problem that it does not burn easily and accumulates in the furnace.

As one countermeasure, there is the method of eliminating the insufficiency of oxygen in the atmosphere of the interior of the furnace body 101 by increasing the feed rate of the oxidizing gas from the first feeding chute 106 mentioned above. However, even if the feed rate of the oxidizing gas is increased, the proportion of oxidizing gas that reaches the accumulated shredder dust is small, and this oxidizing gas is discharged outside of the furnace as unreacted oxidizing gas. Thus, the efficiency is extremely low.

In addition, in the shredder dust fed to the interior of the furnace body, the finely pulverized portion is combusted in the air phase, but, for example, large items such as fragments of tires are not completely burned by the flame, the raw material to be smelted in the furnace accumulates on the surface of the molten material as uncombusted shredder dust, and small piles are formed. When these piles become large, the gap between the piles and the ceiling of the furnace body becomes small, and thereby when the new shredder dust is fed and combusted, there is a concern that the flame due to combustion will blow outside the furnace from the fuel and gas feeding opening for the shredder dust feeding that is directly above. Therefore, in the case that the piles have become large, the feeding of the shredder dust must be stopped until the piles that have accumulated inside the furnace have disappeared. Thereby, the combustion efficiency becomes exceedingly low.

In particular, when large piles are formed at positions in proximity to the burner, the flame of the burner is obstructed by the piles, and the flame of the burner cannot be utilized effectively to melt the raw material to be smelted.

The object of the second embodiment is to provide a furnace for the incineration of shredder dust that restrains the accumulation of shredder dust when it is fed to the interior of the furnace.

The shredder dust of the present invention is dust of the residue that remains after separating the portion that can be reused from large trash such as discarded household appliances and automobiles, shredding this remaining portion into fine fragments, and recovering valuable materials from this shredded material.

Figure 10:
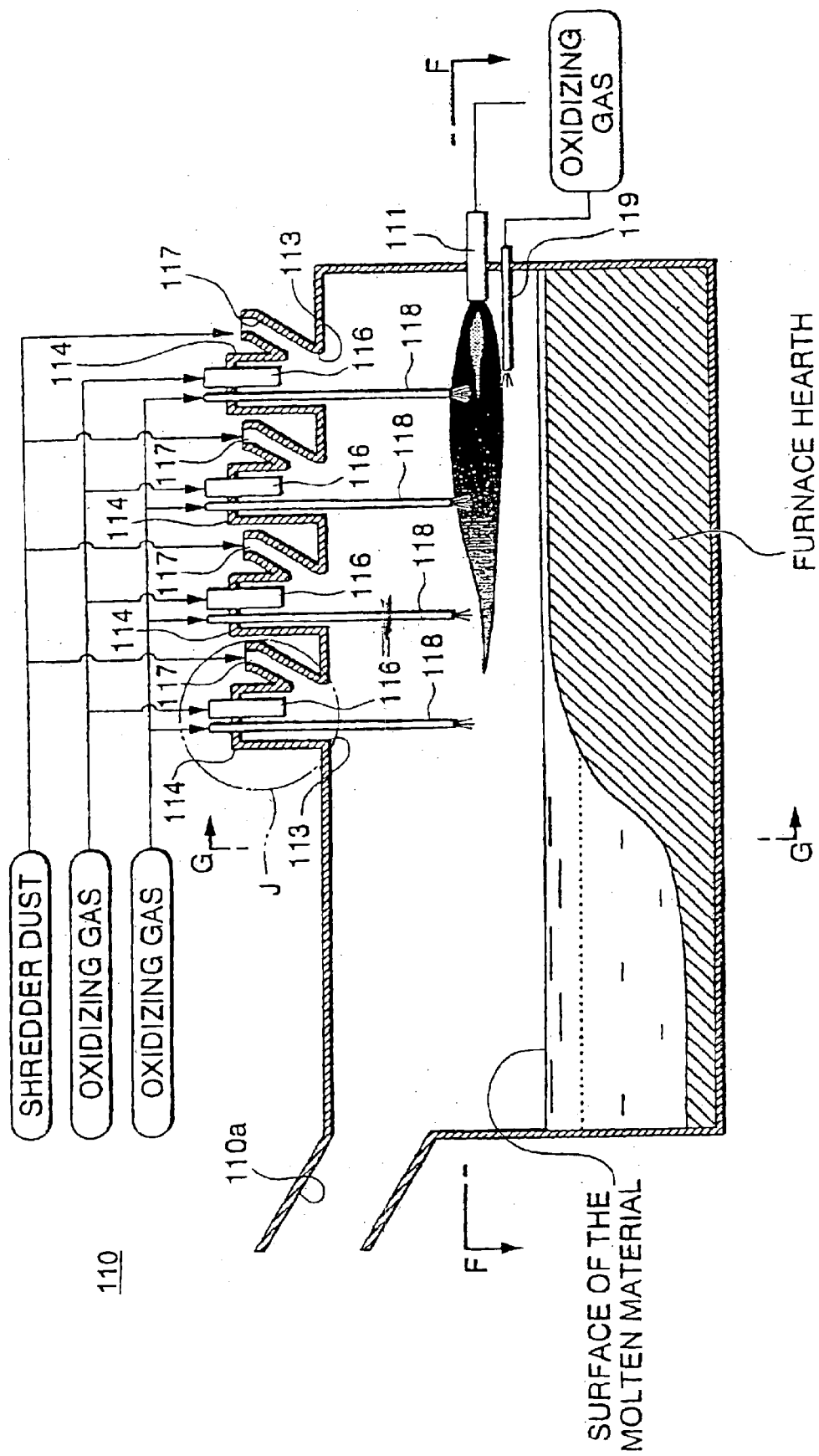
FIG. 10 is a conceptual schematic drawing of the reverberatory furnace having the combustion device for shredder dust of the present embodiment.
Figure 12:
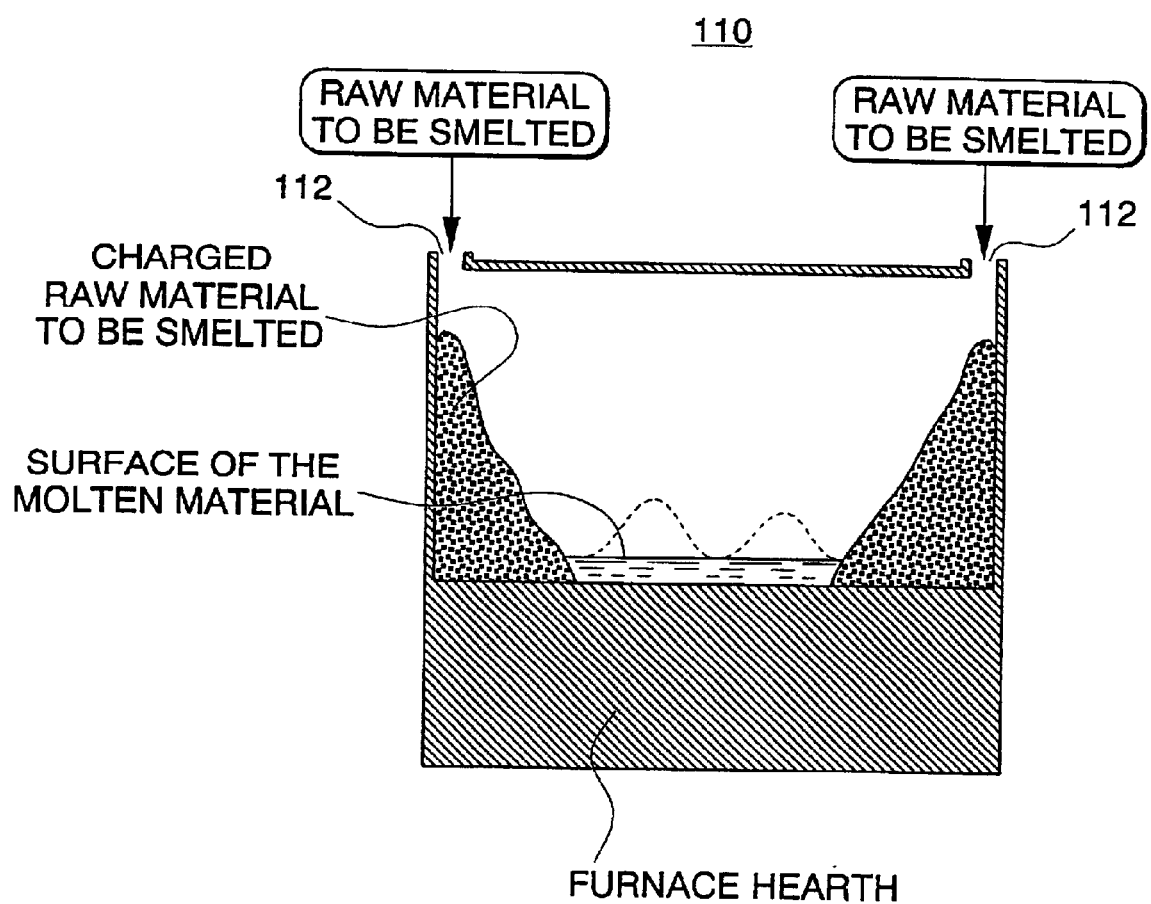
FIG. 12 is a cross-sectional drawing along line G—G in FIG. 10.

FIG. 10 shows the second embodiment of the present invention. As shown in FIG. 10, in the furnace body 110 having a hearth that is flat and has a shallow melting depth, a burner 111 that emits a flame into the interior of the furnace body is provided on the wall on one side. Charcoal, heavy oil, or the like are used as a fuel for the flame that is emitted from the burner 111. This furnace is structured such that the charge (raw material to be smelted) is melted by the heat of the flame of the burner directly or after being reflected by the ceiling of the furnace. In addition, a combusting gas exhaust opening 110a that discharges the gas combusted in the furnace body 110 to the outside of the furnace is provided on the other end side of the furnace body 110. As shown in FIG. 12, a raw material feeding opening 112 for feeding the raw material to be smelted to the interior of the furnace body 110 is provided on both sides of one end of the ceiling of the furnace body 110. In the raw material feeding opening 112, a hopper (not illustrated) that feeds the raw material to be smelted to the interior of the furnace body 110 is disposed arranged along the wall that extends in the longitudinal direction of the furnace body. Returning to FIG. 10, one or a plurality of fuel and oxidizing gas feeding openings 113 are provided at the center of one side of the ceiling of the furnace body 110. While four fuel and oxidizing gas feeding openings 113 are illustrated, depending on the dimensions and shape of the furnace body 110, the type of raw material to be smelted, the quality of the shredder dust, and the like, the number of fuel and oxidizing gas feeding openings 113 can be increased or decreased.

The main feeding chute 114 is built into the fuel and oxidizing gas feeding opening 113, and a first feeding chute 116 that feeds compressed oxidizing gas to the interior of a furnace body 110 is provided inside this main feeding chute 114. A compressor (not illustrated) is connected to the first feeding chute 116, and compressed oxidizing gas is fed into the furnace body 110 by the compressor. Air, gas that includes oxygen, oxygen enriched air, in which the proportion of oxygen in the air is increased, or the like can be used as the oxidizing gas. Gas that includes oxygen and oxygen enriched air is fed from an oxygen source such as an oxygen plant. In addition, a dust feeding chute 117 is connected to the main feeding chute 114. This dust feeding chute 117 feeds shredder dust through the fuel and oxidizing gas feeding opening 113 to the interior of the furnace body 110. A dust feeding apparatus (not illustrated) that feeds shredder dust into the interior of the furnace body is connected to the dust feeding chute 117. A shuttle conveyor is disposed directly above the dust feeding apparatus, and the shredder dust conveyed via the belt conveyor from the feed hopper can be feed to the interior of the furnace body by being charged from the shuttle conveyor to the feeding apparatus.

Figure 13:
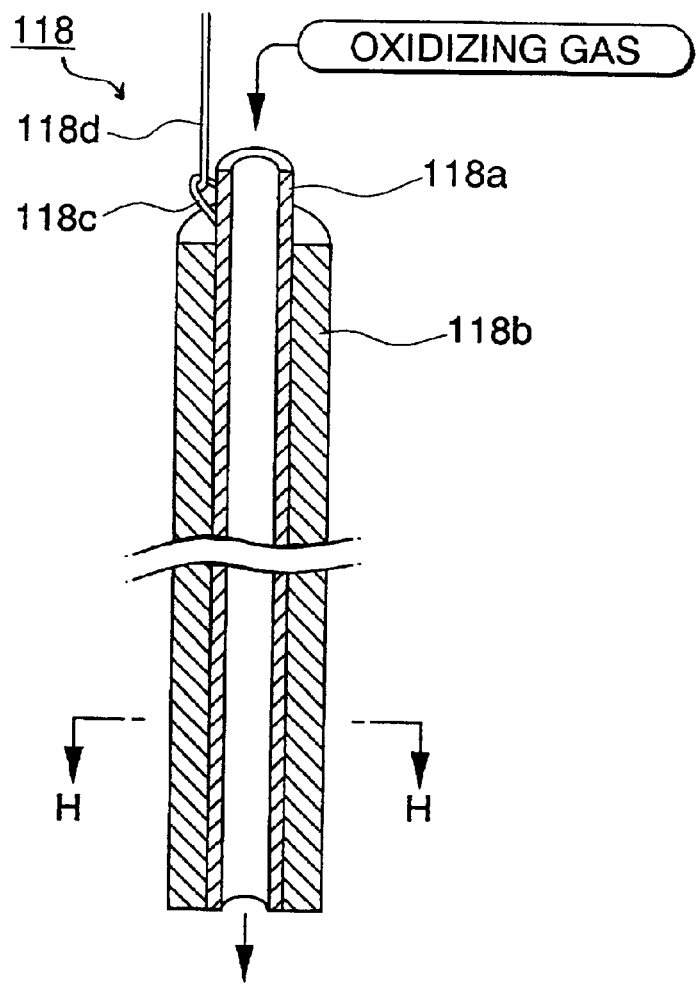
FIG. 13 is an enlarged drawing of the second feeding chute.
Figure 14:
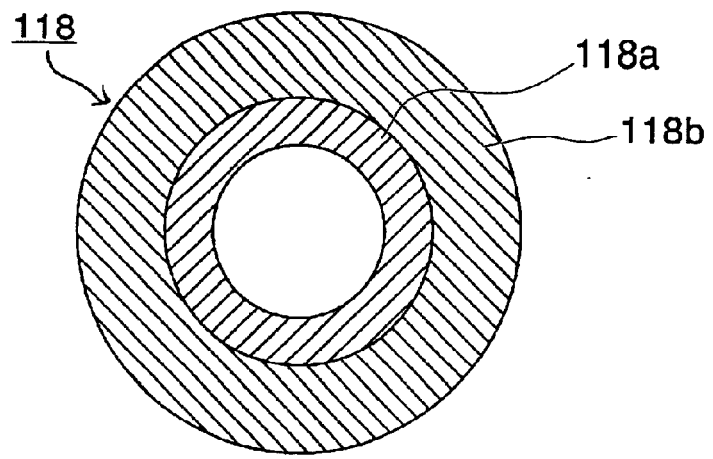
FIG. 14 is a cross-sectional drawing along line H—H in FIG. 13.
Figure 15:
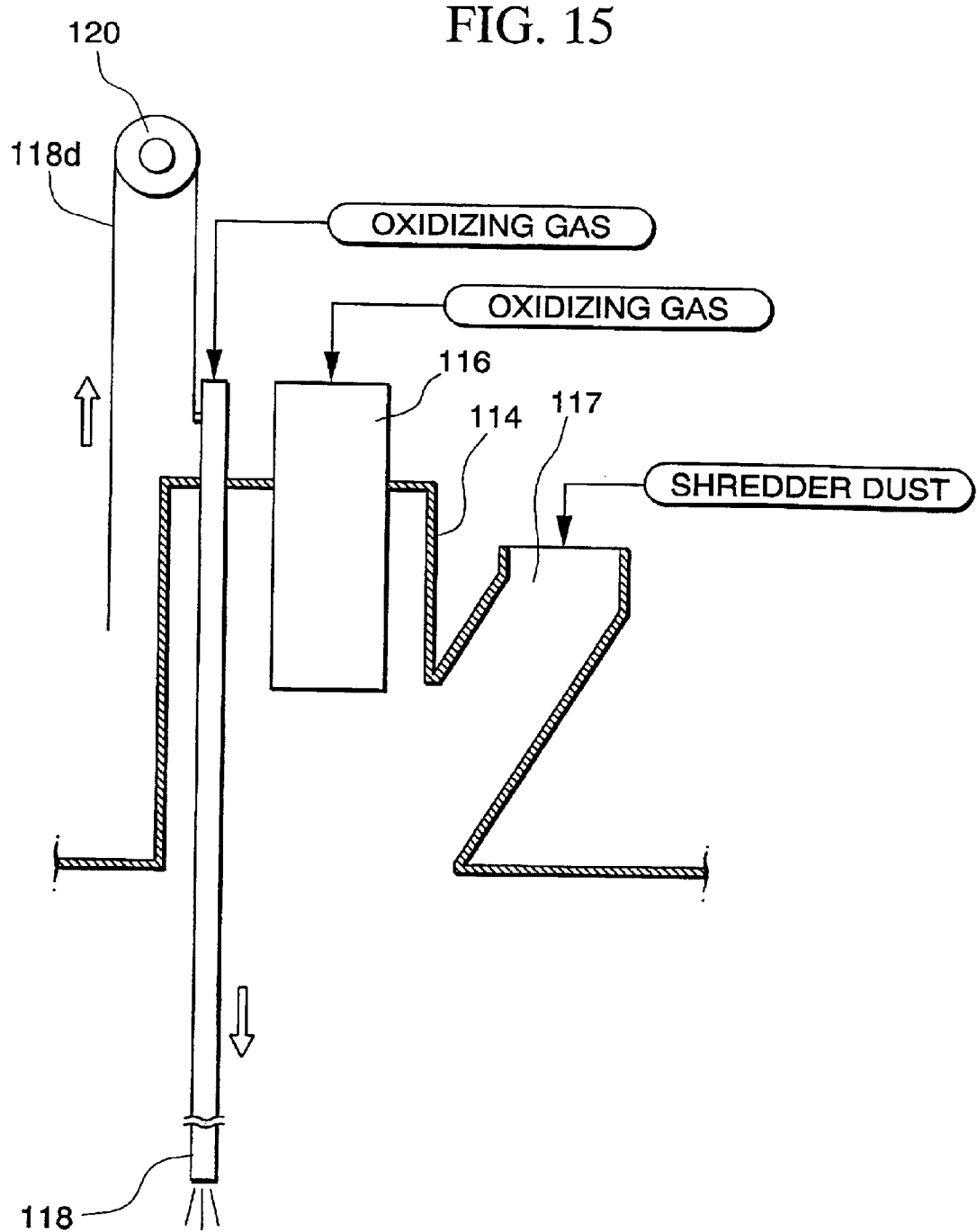
FIG. 15 is a partially enlarged drawing of region J in FIG. 10.

In the structure of the present invention, a second feeding chute 118 that feeds compressed oxidizing gas is installed vertically in the main feeding chute 114 as a combustion device for shredder dust, and the distal end of the second feeding chute 118 is installed so as to blow the oxidizing gas to the shredder dust that has fallen inside the furnace body 110. As shown in FIG. 13, the structure of the second feeding chute 118 comprises an iron or stainless steel hollow chute body 118a a refractory material 118b that covers the perimeter of this chute body 118a, and a hanging hook 118c is provided on the top in order to lower it. FIG. 14 shows the cross-sectional line H—H in FIG. 13. As shown in FIG. 15, conventionally a second feeding chute 118 is vertically installed from the position of a viewing window provided in the lid part of the main feeding chute 114. A wire rope 118d is bound on the hanging hook 118c of the second feeding chute 118, and the other end of the wire rope 118d is connected to the upper end of the main feeding chute 114 via a sheave 120, and the second feeding chute 118 is hung so as to be movable up and down by unfastening the wire rope 118d from the upper end of the main feeding chute 114.

In the present embodiment, for example, the chute body 118a of the second feeding chute 118 has an inner diameter of 25.4 mm, the thickness of the same is 5 mm, and the refractory material 118b of the same is 10 to 20 mm. Oxides such as $Al_2O_3$, $SiO_2$ and the like can be used as for the refractory material 118b. While the length of the second feeding chute 118 differs depending on the scale of the reverberatory furnace, a length that such that the distal end of the second feeding chute extending from the ceiling of the furnace body 110 reaches a position that allows the oxidizing gas to blow onto the falling shredder dust is suitable. A compressor (not illustrated) is connected to the second feeding chute 118, like the first feeding chute 116, and the compressed oxidizing gas is fed to the interior of the furnace body 110. The oxidizing gas feed into the furnace body by the second feeding chute 118 can be of a type that differs from or is identical to the oxidizing gas feed to the interior of the furnace body by the first feeding chute 116.

Next, smelting that uses the reverberatory furnace having this type of structure will be explained.

First, a flame is emitted from the burner 111 provided on one side of the wall of the furnace body 110, and the interior of the furnace body 110 is heated. Next, the raw material to be smelted is fed from the raw material feeding opening 112 provided on both sides of one end of the furnace body 110 to the interior of the furnace body 110 by the hopper (not illustrated). In addition, in the interior of the furnace body 110, compressed oxidizing gas is blown from the first feeding chute 116 provided at the center of the ceiling on one side thereof, and the shredder dust is fed by the dust feeding chute 117. The raw material to be smelted that has been fed into this furnace body 110 is heated and melted the radiated heat of the flame emitted by the burner 111 and the combustion heat generated by the combustion of the shredder dust.

The finely pulverized shredder dust fed into the furnace body 110 from the dust feeding chute 117 combusts before reaching the furnace hearth, but large shredder dust such as fragments of tire and the like are not completely burned and form small piles by accumulating on the surface of the molten material, which is the raw material to be smelted in the furnace that has melted, as uncombusted shredder dust that has incompletely burned. Compressed oxidizing gas is fed by the second feeding chute 118 installed vertically in the interior of the main feeding chute 114 to the piles comprising uncombusted shredder dust. The distal end of the second feeding chute 118 is installed so as to be positioned 0.3 to 3 m above the furnace hearth (for example, 0.3 to 3 m above the surface of the molten material formed by the melting of the raw material to be smelted, and is installed so that the oxidizing gas blows on the shredder dust falling in the interior of the furnace body 110. Because the piles comprising uncombusted shredder dust are scattered by the compressed oxidizing gas fed by the second feeding chute 118 and the oxidizing gas is fed, it burns easily and combusts without accumulating again. In addition, because not only the shredder dust that has already accumulated, but the falling shredder dust fed from the ceiling is also blown by the oxidizing gas, the combustion efficiency of the shredder dust increases over that of the conventional technology.

When the oxidizing gas from the second feeding chute 118 is air, the blowing pressure is 6.0 kg/cm², and when the oxidizing gas is a gas that incorporates oxygen or oxygen enriched air, the blowing pressure is 3.5 kg/cm². Because oxidizing gas blows from the distal end of the second feeding chute 118, gradually soldering damage occurs from the distal end. Thus, the second feeding chute 118 is installed vertically in the interior of the furnace body, and in the case that the reverberatory furnace is operated continually, the second feeding chute 118 must be lowered by being moved by a wire fastened to the second feeding chute 118 so that its distal end always blows the oxidizing gas on the falling shredder dust. In the case that the second feeding chute 118 is provided so as to be continuous with the interior of the furnace body 110, soldering damage gradually occurs to its distal end, and it may break and fall off. Thus, the second feeding chute 118 must be replaced about every two days.

Figure 11:
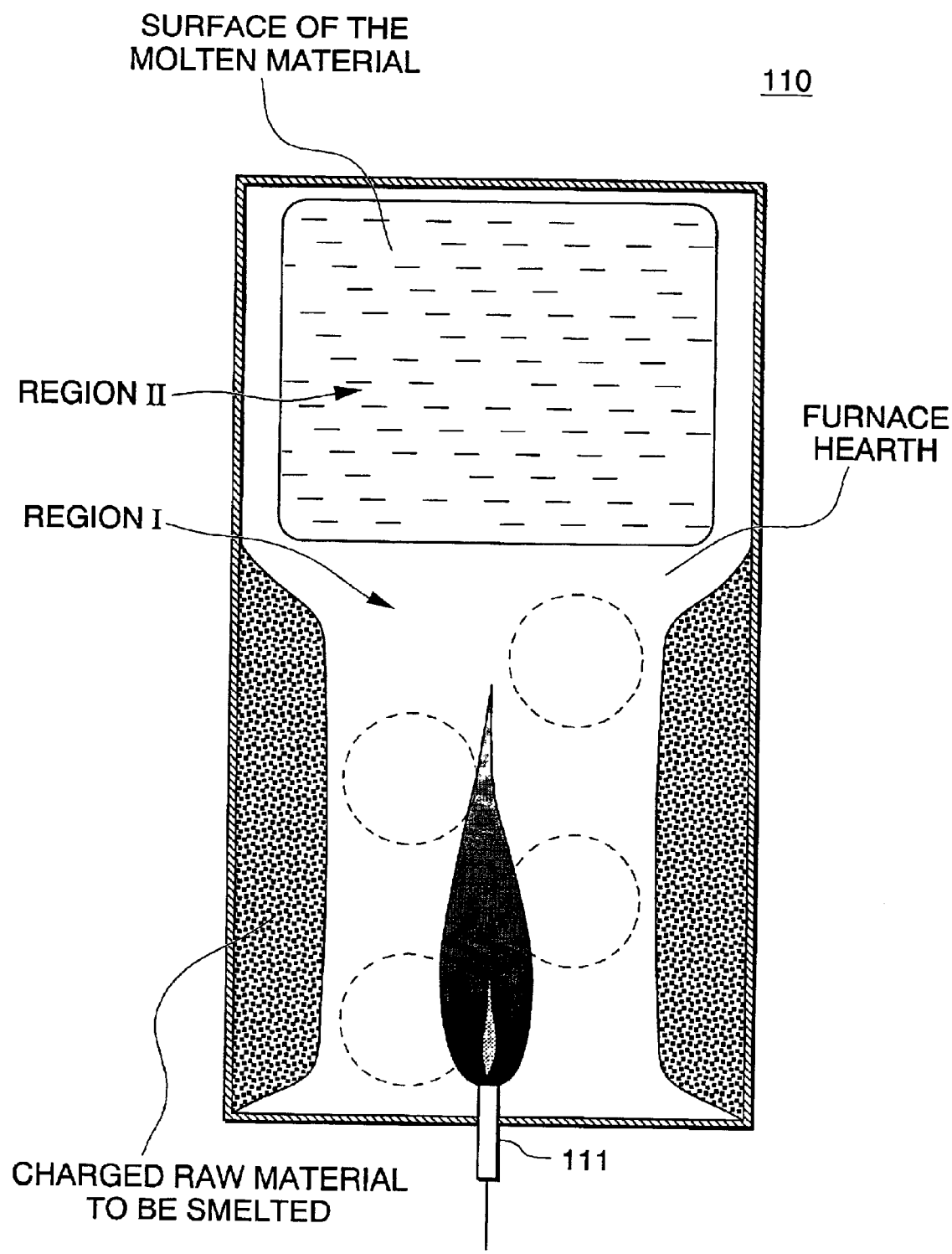
FIG. 11 is a cross-sectional drawing along line F—F in FIG. 10.

As shown in FIG. 11, the one side of the furnace body is the area (region I in FIG. 11) in which the raw material to be smelted is melted by the radiated heat due to the combustion, and the other side of the furnace is the region (region II in FIG. 11) where the raw material to be smelted that has melted into matte and slag or the like are separated. Matte is also referred to as regulus, and is formed as an intermediary product in the case that metal is extracted by fusion smelting from the ore of a sulfide, and thus is a molten material comprising several types of sulfides melted together. In addition, in the refining of metals, after removing the metal component that is the object from the ore, slag is the molten material comprising mainly the oxides of the impurities in the ore. The matte and slag can be separated in the smelting furnace by the respective differences in their specific gravity. The region shown by the broken line in FIG. 11 is the region in which the uncombusted shredder dust accumulates in the conventional technology.

The exhaust gas that results from combustion is discharged outside the furnace through the combusted gas discharge opening 110a, and the heat is recovered and cooled by a waste heat boiler (not illustrated) and cooled, the dust is recovered in an electrostatic precipitator, and then the $SO_2$ in the gas is recovered as gypsum in a gypsum extraction plant.

In addition, in the furnace having the combustion device for shredder dust of the present invention, a third feeding chute 119 that feeds compressed oxidizing gas can be provided on the wall of one side of the furnace body to combust the shredder dust. By feeding the compressed oxidizing gas from the third feeding chute 119 so as to blow on the falling shredder dust, the formation of piles of shredder dust that may block the combustion of the burner can be inhibited, and thus a higher combustion efficiency can be implemented. This third feeding chute 119 has a structure identical to that of the second feeding chute described above, and comprises a hollow iron or stainless steel chute body 119 and a refractory material that covers the periphery of this chute body 119.

In this embodiment, the reverberatory furnace was used as one example of a furnace for burning shredder dust, but in addition to a reverberatory furnace, identical effects can be attained by using a melting furnace, a flash furnace, a fusion furnace, a slag cleaning furnace, a fluidized hearth furnace, a shaft furnace, a rotary kiln furnace, a stoker furnace, an industrial waste processing furnace, and the like.

As described above, in the furnace for burning shredder dust of the second embodiment, a second feeding chute that feeds a compressed oxidizing gas is installed vertically inside the main feeding chute as a combustion device for the shredder dust, and the second feeding means is provided such that the distal end thereof blows oxidizing gas to the interior of the furnace body, and thus when the shredder dust is fed as fuel to the interior of the furnace body, the accumulation of shredder dust can be inhibited.

What is claimed is:

1. A furnace for burning shredder dust, comprising:

a furnace body having first and second sides, walls, and a ceiling;

a burner which is provided on the wall on the first side of said furnace body and emits flame to the interior of said furnace body;

one or a plurality of a raw material feeding opening which is provided on the first side of the ceiling for feeding the raw material to be smelted to the interior of said furnace body;

one or a plurality of a fuel and oxidizing gas feeding opening which is provided on the ceiling on said first side;

a main feeding chute which is respectively connected to said fuel and oxidizing gas feeding opening;

a first feeding chute that is installed inside said main feeding chute and feeds a compressed oxidizing gas into said furnace body; and a dust feeding chute that is connected to said main feeding chute and feeds shredder dust in the interior of said furnace body via said fuel and oxidizing gas feeding opening; and a second feeding chute that is installed through said main feeding chute such that the distal end of said second feeding chute is positioned lower than the distal end of said first feeding chute, and that said second feeding chute thereof blows oxidizing gas to the shredder dust fallen into the interior of said furnace body.

2. A furnace according to claim 1, wherein the second feeding chute is supported so as to be movable up and down by a hanging member.

3. A furnace according to claim 1, further comprising a third feeding chute that is provided on the first side of the furnace body and feeds compressed oxidizing gas toward the second side of the furnace body to blow on the shredder dust fallen into the interior of said furnace body.

4. A furnace according to claim 1, wherein the second feeding chute comprises a chute body formed by iron or stainless steel and a refractory material that covers the periphery of said chute body.

5. A furnace according to claim 3, wherein at least one of the second feeding chute and the third feeding chute comprises a chute body formed by iron or stainless steel and a refractory material that covers the periphery of said chute body.

6. A furnace according to claim 1, wherein said furnace body is a reverberatory furnace.

* * * * *